March 17, 1953     D. W. SHAEFFER ET AL     2,631,931
GAS DISTRIBUTION SYSTEM PRESSURE CONTROL
Filed Dec. 27, 1949
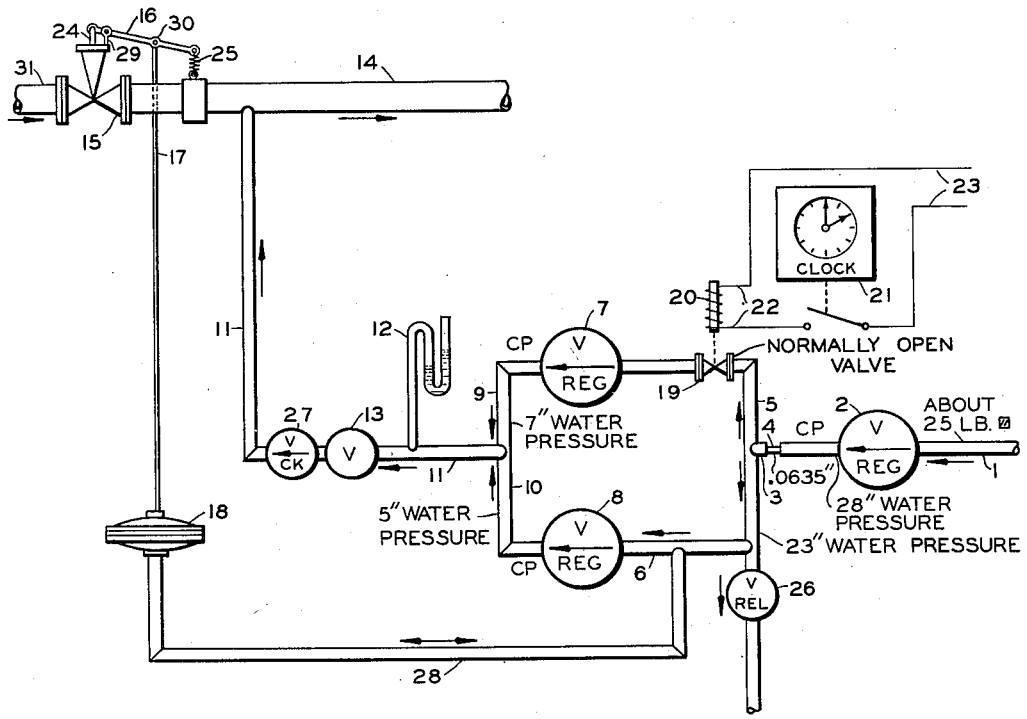
INVENTORS.
D. W. SHAEFFER
F. A. COWELL
BY Hudson & Young
ATTORNEYS Patented Mar. 17, 1953

2,631,931

UNITED STATES PATENT OFFICE 2,631,931

GAS DISTRIBUTION SYSTEM PRESSURE CONTROL

David W. Shaeffer and Frank A. Cowell, St. Louis, Mo., assignors to Phillips Petroleum Company, a corporation of Delaware Application December 27, 1949, Serial No. 135,192

9 Claims. (Cl. 48—191)

This invention relates to apparatus for use in control of pressures in city gas mains. In another aspect, this invention relates to apparatus for the control of pressures in city gas mains during peak-load as well as during normal load periods.

Many devices are in use for controlling pressures in city gas mains. One type of apparatus which is used for such purposes controls the pressure in the main in response to gas main pressure. At times when demand is high and gas pressures decrease below a certain minimum pressure, the apparatus operates to supply additional gas from an extra supply source to the main. When pressure reaches a predetermined maximum pressure, the apparatus also operates to close off or to partially close off the extra gas supply source previously added. With the use of such a system, it is obvious that a pressure decrease must occur before additional gas is added. And accordingly, at an appliance the pressure also decreases and a considerable lag may occur between the time of minimum pressure and the time when the additional gas becomes available at an appliance.

We have devised an apparatus for use in the control of gas pressures in city mains in which a minimum pressure is not relied upon to start operation of the apparatus which finally increases the gas pressure. Peak-load requirements usually occur about the same time each day and hence, we have found that the use of a time clock in conjunction with other apparatus elements serves exceptionally well to furnish additional gas during peak-load requirement periods.

An object of our invention is to devise an apparatus for use in the control of gas pressures in gas mains.

Another object of our invention is to devise an apparatus for use in the control of pressures in gas mains during peak-load requirement times as well as during periods of normal requirement.

Another object of our invention is to devise a relatively inexpensive apparatus for control of gas main pressures.

Still another object of our invention is to devise an apparatus which may be assembled from apparatus parts normally available in city gas distribution plants.

Other objects and advantages will be apparent upon reading the following description, which, taken with the attached drawing, forms a part of this specification.

In the drawing, the figure represents one embodiment of apparatus parts useful for carrying out the objects of our invention. Referring now to the drawing, reference numeral 1 refers to a conduit for passage of a gas from a source, not shown, into a pressure-reducing apparatus 2. A conduit 3 is provided with an orifice 4 and is manifolded to lines 5 and 6. At the end of line 6 is a pressure-reducing apparatus 8. From this pressure-reducer, a line 10 leads to a line 11. Line 5 is provided with an on-off valve 19. This valve communicates through an extension of line 5 to a pressure-reducing apparatus or regulator 7. The outlet end of this regulator is connected by a line 9 to the pipe 11. Pipe 11 is provided with a pressure-indicating apparatus 12. Line 11 is also equipped with a valve 13 and a check valve 27. At some point in line 6, in line 5 upstream of the valve 19, or in line 3 downstream of the orifice 4 is provided a relief valve 26. In like manner, at some point in line 6, in line 5 upstream of the valve 19, or in line 3 downstream of the orifice 4, is connected a pipe 28. The other end of the pipe 28 is attached to the underside of a diaphragm of the apparatus 18. To the top of the diaphragm is attached a rod or other element 17, which in turn is attached to a lever arm 16. The lever arm 16 pivots about a fulcrum 29, to raise or to lower a rod 24. Rod 24 may be termed a "valve stem," if desired, since this rod operates the valve 15. A pipe 14 is a gas main leading from valve 15 and a source of gas 31, to a gas distribution system and appliances, also not shown. This pipe 14 is hereinafter called a gas main. The lever rod 16 extends beyond the pivot point 30 and this extended end is attached to the main 14 or to another object of fixed position by a tension spring 25. Reference numeral 20 refers to a solenoid. Numeral 21 refers to a timing apparatus which is connected by some electrical wires 22 to the solenoid 20. Wires 23 lead from a source of electrical current, not shown, to the timing apparatus 21.

The solenoid-operated valve 19 is of the type wherein the valve is open at times when no electrical current is flowing through the solenoid and is closed when current is flowing. Such valves are known as normally open solenoid valves.

In many city gas mains gas is not maintained at very high pressures and pressures in such systems are frequently indicated in terms of inches head of water. For example, 5" water pressure means that the pressure of the gas is equivalent to the pressure exerted by a column of water 5 inches in height, as indicated by a water manometer, i. e. a pressure slightly above atmospheric.

In some municipal systems, a 5" pressure of gas is sufficient for forcing the gas in normal times through the distribution lines to the appliances. However, during peak-load periods, a greater main pressure is required to furnish sufficient gas for the operation of appliances in a normal manner. Our invention provides apparatus for automatically increasing gas main pressure during peak-load requirement times and then for automatically decreasing the pressure during times of normal requirements.

In gas distribution systems, the loss of gas by leakage is sometimes an important factor to be considered in the operation of such systems. The loss of gas obviously directly affects the economics of the operation of gas distribution systems. Gas leakage also presents fire hazards. It is thus advantageous to operate gas distribution systems at as low a pressure as possible at all times, and yet furnish sufficient gas to meet consumer requirements. For this reason it is not necessary to maintain high pressures at all times, but such pressures may be maintained only during peak-load requirement times. Our apparatus is also designed with the idea in mind that high pressures be used only during peak-load requirement times and in normal requirement times, lower pressures are used. As mentioned above, maintenance of lower pressures minimizes leakage losses and when lower pressures are maintained during a major portion of an operating day, leakage losses are accordingly materially reduced.

The throttle valve 15 is intended to be the type of valve which can remain partly open and then when necessary can be opened still further or partially closed. In the drawing this valve is illustrated as being mechanically operated by the diaphragm 18 and lever assembly. This valve need not specifically be operated by the type of mechanism herein described, it may be controlled directly by a diaphragm or it may be electrically operated. In like manner, the valve 19 need not necessarily be a solenoid-operated valve, but if desired, may be pneumatically or mechanically operated, provided such other type of operation is adaptable to operation of on-off type of valves. The pressure-reducing regulators 2, 7, and 8 may be of any suitable type, provided they serve the purpose as herein described.

According to the conditions of operation described herein, regulator 8 is set to discharge gas up to a maximum pressure of a 5" head of water, while regulator 7 is set to discharge gas at a pressure of up to a 7" head of water. Regulator 2 is set to discharge gas at a pressure of about 28" of water.

In the operation of our apparatus during off peak requirement times, fuel gas flows through the main 14, controlled by valve 15, which is operated to control the pressure downstream of this valve at a pressure of 5" of water. If for some reason the pressure in the gas main downstream of the valve 15 decreases somewhat, the following sequence of steps occurs. Gas at about 25 pounds pressure, from a source not shown, flows through pipe 1 into the pressure-reducing regulator 2. The gas issues from this regulator at a pressure of about 28" of water. The orifice 4 may be a conventional form of orifice or may even be an orifice union. The opening forming the orifice may be of about a #52 drill size. The gas issuing from regulator 2 then flows through this orifice into the pipe 3. When the valve 19 is closed and the regulator 8 is in operation, the pressure maintained on the downstream side of the orifice 4 is about equivalent to a 23" head of water. This pressure is communicated via pipe 28 to the chamber beneath diaphragm 18. So long as the main pressure is less than 5" water, a small amount of this gas bleeds through the regulator 8 into the pipe 10 and it flows on through pipe 11, valve 13, and check valve 27, into the gas main downstream of the valve 15. If the gas pressure in the main decreases, the amount of gas passing through the regulator 8 is increased somewhat and this increased flow of gas causes a pressure drop in pipe 6. This lower pressure in pipe 6 is communicated through tube 28 to the underside of the diaphragm 18. The reduction of pressure under this diaphragm in combination with the action of the tension spring 25 causes the downward movement of the lever 16. This action raises the valve rod 24 and opens further the throttle valve 15 to permit the flow of more gas through the main 14. Gas holder pressure supplying main 14 may be at such a pressure as 8½" of water.

With more gas flowing through the throttle valve 15, pressure downstream of this valve then increases and when the pressure reaches the equivalent of a 5" head of water, this 5" pressure is communicated through check valve 27 and valve 13 in line 11 and on through lines 11 and 10 to the regulator 8. When this pressure reaches the regulator 8, gas ceases to flow through the regulator from pipe 6 to pipe 10. This stoppage of flow then causes the pressure in pipe 6 to build up and this increased pressure is communicated through pipe 28 to the underside of the diaphragm 18 and accordingly, the diaphragm is raised. When the diaphragm raises, then the lever arm 16 raises and the valve rod 24 is lowered to at least partially close off valve 16 to throttle the flow of gas. When the throttle valve 15 partially closes if the downstream main pressure is reduced to a value below 5" of water, then the aforementioned sequence of steps occurs to open the valve 15 and permit increased flow of gas.

Early morning hours, for example, from about 5:30 to 9:00 a. m. when more domestic appliances are in use, more gas must be supplied. We have accordingly provided for this contingency an auxiliary pressure-reducing regulator 7 and associated parts. This regulator is set at 7" of water pressure, since we have found that by increasing the gas pressure from 5" to 7", peak-load requirements are met. The time clock apparatus 21 may be set to operate at, for example, 5:30 a. m. Thus at this time, the clock operates to break the circuit flowing through the wires 22 to permit the solenoid valve 19 to open to its normal position. When valve 19 opens, gas from line 5 flows through valve 19 into the regulator 7, some gas then bleeds through this regulator into line 9, and on through line 11 into the gas main. The flow of gas through regulator 7 then causes a decrease in the pressure of gas in line 5 and this decrease in pressure is communicated through line 6 and line 28 to the underside of the diaphragm 18. This pressure reduction combined with the action of the tension spring 25 causes the valve 15 to open somewhat and permit greater flow of gas. Then the pressure in the main downstream of the valve 15 increases. When this pressure reaches that equivalent of 7" of water, the regulator 7 closes and the pressure in line 5 increases and this increase is communicated to the underside of the diaphragm 18.

The throttle valve 15 then partly closes and normal operation then maintains a pressure of about 7" of water in the gas main. Under these latter conditions, this higher gas pressure is communicated though line 10 to the downstream side of regulator 8, but since regulator 8 is set at 5" of water, there is, of course, no flow of gas from line 6 to line 10. Regulator 8 then merely stands by.

When peak-load requirements cease, the time clock 21 closes the circuit flowing through lines 22 and causes the solenoid 20 to close the valve 19. With no gas flowing through regulator 7 and also no gas flowing through regulator 8, pressure in lines 5 and 6 increases to raise the diaphragm 18 and partially close the valve 15. When the pressure in the gas main drops to a value below 5" head of water, regulator 8 then opens to permit flow of gas from line 6 to line 10 and the system is back on the 5" gas pressure operation.

We have found that the time clock 21 may be a 3-point time clock set to close the circuit in lines 22 at 9 a. m., 12:30 p. m., and at 7 p. m., and to open the circuit through lines 22 at 5:30 a. m., 11 a. m., and 4:30 p. m. Thus, under this operation, valve 19 will be open between 5:30 and 9 a. m., between 11 a. m. and 12:30 p. m., and between 4:30 and 7 p. m to furnish peak-load gas. At all other times during the 24 hour day, the valve 19 will be closed and the system will be operating under the 5" head of water pressure.

The pressure indicating device 12 may be merely a pressure indicating device or it may be a pressure-indicating and recording device. The latter type of device is very useful in case permanent records are desired. The pressure-indicating portion of the device may be a simple manometer or any other type of pressure indicator.

The pressure relief valve 26 may be set to relieve pressure when pressures in pipes 3, 5, and 6 reach about 28" of water. This relief valve may, however, be set to relieve pressure at any other pressure desired, but we have found that when set at 28", with a normal pressure of 23" in lines 5 and 6, that operation is satisfactory. The source of gas entering pipe 1 does not necessarily need to be at a pressure of 25 pounds, but may be at most any pressure desired. When other pressures are so used, the regulator 2 then must be designed and operated to handle such other pressures.

The type of gas passing through the main 14 may be any type of gas desired, such as natural gas, liquefied petroleum gases in vapor form, or manufactured gases. However, when natural gases are used, or when manufactured gases are used, it may be desirable to operate at some different normal load and peak-load pressures. The gas entering the control systems through pipe 1 may be the same gas which is flowing through the main, or it may be some other gas, preferably a fuel gas.

A normally open solenoid valve is preferred since any interruptions of the electrical power flowing through the coil of the solenoid valve, through the time clock contacts, or a power failure from the source of supply, would de-energize the solenoid which would open the valve 19. With this valve open, gas of 7" water pressure is admitted to the main 14 and thus provides peak-load gas. It is considered more desirable to provide 7" pressure gas between peak-load times than to furnish only 5" pressure gas during peak-load periods.

The solenoid operated valve 19 may be in line 9 downstream from the regulator 7, if desired, but it is preferable to position this valve in line 5 as shown in the drawing.

The above-described pressure and flow control apparatus is given for illustrative purposes and should not be regarded as limiting the invention, the scope of which is set forth in the following claims.

Having described our invention, we claim:

1. An apparatus for the control of pressure in a gas main comprising in combination, a first source of gas under pressure, a gas main for passage of gas from said source to an appliance, a first pressure-reducing means between said source and said main, a secondary source of gas under pressure, conduit means for passage of gas from said secondary source to said main, a second pressure reducing means in said conduit adapted to maintain a maximum outlet pressure, an orifice in said conduit between said secondary source of gas and said second pressure reducing means, an on-off valve in said conduit adapted to close and to open said conduit to the flow of gas, a time controlled on-off valve actuating means in operable communication with said on-off valve, and a gas pressure actuated motor responsive to gas pressure in said conduit means for operating said first pressure reducing means.

2. An apparatus for controlling the pressure and flow of a fuel gas in a gas main during peak-load and off-peak periods comprising, in combination, a source of fuel gas under pressure, a gas main for passage of said fuel gas from said source to an appliance, a pressure reducing means between said source and said main, a secondary source of gas under pressure, a first conduit means for passage of gas from said secondary source, a pressure reducing means between said secondary source and said first conduit means, an orifice in said first conduit means, a pair of conduits in parallel connecting said first conduit means to a second conduit means, said second conduit means connected with said main, a first constant pressure regulator adapted to maintain a predetermined maximum outlet pressure disposed in one conduit means of said pair of conduits, a second constant pressure regulator adapted to maintain a predetermined maximum outlet pressure higher than aforesaid predetermined maximum outlet pressure and an on-off valve disposed in the other conduit of said pair of conduits upstream of said second constant pressure regulator, a gas pressure actuated motor in operative attachment to one of said conduits upstream of said first constant pressure regulator, downstream of said orifice and upstream of said on-off valve, said gas pressure actuated motor being connected operatively with said pressure reducing means between said source of fuel gas and said main, and a time control on-off valve actuating means in operable communication with said on-off valve.

3. In the apparatus of claim 2 wherein the pressure reducing means between said source of fuel gas and said main is a throttle valve.

4. In the apparatus of claim 2 wherein said on-off valve is a solenoid operated on-off valve.

5. In the apparatus of claim 2 wherein said time controlled assembly is adapted to close and to open an electrical circuit to said solenoid.

6. In the apparatus of claim 2 wherein said time control on-off valve actuating means is a time clock controller-solenoid assembly and said on-off valve is a solenoid operated valve.

7. An apparatus for controlling pressure and flow of a fuel gas in a main during peak-load and off-peak periods comprising in combination a first source of fuel gas under pressure, a gas main for passage of said fuel gas from said source to an appliance, a first pressure reducing means between said source and said main, a secondary source of gas under pressure, one end of a first conduit attached to said secondary source of gas, said first conduit containing an orifice, second and third conduits attached to the other end of said first conduit, a second pressure reducing element in said second conduit adapted to maintain a first predetermined maximum outlet pressure, a third pressure reducing element in said third conduit adapted to maintain a second predetermined maximum outlet pressure greater than said first predetermined maximum outlet pressure, conduit means connecting said second and third conduits with said main, an on-off valve in said third conduit intermediate said third pressure reducing element and the point of attachment of said second and third conduits with said other end of said first conduit, a time controlled on-off valve actuating means in operable communication with said on-off valve and a gas pressure actuated motor responsive to gas pressure in said conduits at a point upstream from said second pressure reducing element, upstream of said on-off valve and downstream of said orifice to operate said first pressure reducing means.

8. In the apparatus of claim 7 wherein said time controlled on-off valve actuating means is a time-clock controller-solenoid assembly.

9. An apparatus for controlling the pressure and flow of a fuel gas in a gas main during peak-load and off-peak periods comprising, in combination, a source of fuel gas under pressure, a gas main for passage of said fuel gas from said source to an appliance, a pressure reducing means between said source and said main, a secondary source of gas under pressure, a first conduit means for passage of gas from said secondary source, a pressure reducing means between said secondary source and said first conduit means, an orifice in said first conduit means, a pair of conduits in parallel connecting said first conduit means to a second conduit means, said second conduit means connected with said main, a first constant pressure regulator adapted to maintain a predetermined maximum outlet pressure disposed in one conduit of said pair of conduits, a second constant pressure regulator adapted to maintain a predetermined maximum outlet pressure higher than aforesaid predetermined maximum outlet pressure and an on-off valve disposed in the other conduit of said pair of conduits, said on-off valve disposed upstream of said second constant pressure regulator, a gas pressure actuated motor in operative attachment to one of said conduits upstream of said first constant pressure regulator, downstream of said orifice and upstream of said second constant pressure regulator, said gas pressure actuated motor being connected operatively with said pressure reducing means between said source of fuel gas and said main, and a time control on-off valve actuating means in operable connection with said on-off valve.

DAVID W. SHAEFFER.
FRANK A. COWELL.

REFERENCES CITED

The following references are of record in the file of this patent:

UNITED STATES PATENTS

| Number | Name | Date |
|---|---|---|
| 1,854,893 | Farrar et al. | Apr. 19, 1932 |
| 1,999,740 | Schmidt | Apr. 30, 1935 |